US005793507A

United States Patent [19]
Giles et al.

[11] Patent Number: 5,793,507
[45] Date of Patent: Aug. 11, 1998

[54] DISCRETELY CHIRPED MULTIPLE WAVELENGTH OPTICAL SOURCE FOR USE IN A PASSIVE OPTICAL NETWORK TELECOMMUNICATIONS SYSTEM

[75] Inventors: Clinton Randy Giles, Morganville; Martin Zirngibl, Middletown, both of N.J.

[73] Assignee: Lucent Technologies Inc., Murray Hill, N.J.

[21] Appl. No.: 656,023

[22] Filed: May 31, 1996

[51] Int. Cl.[6] ............................................. H04J 14/02
[52] U.S. Cl. ........................ 359/125; 359/157; 359/128; 359/134
[58] Field of Search ........................ 359/124, 125–126, 359/127–128, 133–134, 157, 168, 110, 120–121; 372/50

[56] References Cited

U.S. PATENT DOCUMENTS

5,450,431  9/1995  Glance et al. ............................. 372/50

Primary Examiner—Kinfe-Michael Negash

[57] ABSTRACT

In a fiber optic communication system, a multifrequency light source generates a signal having a plurality of discrete and temporally spaced wavelengths. The wavelengths can be modulated with data for transmission in an optic medium. The multifrequency light source is cascaded with a power splitter for dividing the generated signal into a plurality of multifrequency signals of substantially equal power. The wavelengths in the plurality of signals may be modulated with data for transmission in an optic medium to a plurality of optic receivers for retrieval of the data.

8 Claims, 6 Drawing Sheets

DISCRETELY CHIRPED MULTIPLE WAVELENGTH OPTICAL SOURCE FOR USE IN A PASSIVE OPTICAL NETWORK TELECOMMUNICATIONS SYSTEM

BACKGROUND OF THE INVENTION

I. Technical Field of the Invention

The present invention relates generally to improvements in optical communications systems. More particularly, the present invention relates to a multiple wavelength communications system using a discretely chirped multiple wavelength optical source.

II. Description of the Related Art

The transmission capacity of optical communications systems is presently limited by the optical source modulation bandwidth and dispersive and nonlinear propagation effects. Although the optical fiber has a very broad optical bandwidth (10–20 THz), the system data rates transmitted over fibers are presently limited to about 2.5 Gbits/sec for single-channel communications systems using typical single-channel communications approaches with conventional sources such as wavelength-tuned distributed-feedback (DFB) lasers.

Wavelength division multiplexing (WDM) generally increases optical system capacity by simultaneously transmitting data on several optical carrier signals at different wavelengths resulting in an increase of the total system capacity by a factor equal to the number of different wavelength channels. WDM systems are also advantageous in point-to-multipoint communications systems such as fiber-to-the-home systems. In this case, improved power budget, security, upgradability, service flexibility and lower component speed requirements compared to time-division-multiplex (TDM) point-to-point links make WDM attractive.

As used herein, the term "WDM" system refers generally to a system capable of transmitting data on several wavelength channels. WDM systems are distinguished from other systems and use a number of individual optical modulated sources which are tuned to different wavelengths and then combined and transmitted together.

Prior art WDM systems which transmit data on many channels generally include a separate optical modulation source for each channel. For example, an array of laser diodes may be used with each laser diode tuned to a different frequency and individually modulated. The laser frequencies are usually evenly spaced and are combined using an optical coupler and then transmitted through an optical fiber. At the other or remote end of the fiber, a device is used to separate the plural wavelength channels, whereupon the individual or separate wavelength channels are directed to corresponding optical receivers.

Despite the substantially higher bandwidth in fiber-based communications schemes that is attainable with a WDM approach, present WDM systems suffer from a number of difficult technical problems. For example, WDM systems would be most cost-effective for a large number of channels (32 to 64, or even 128). However, present multi-channel laser diodes are very difficult to fabricate with acceptable yield, even with as few as 8 channels. In addition, currently available passive WDM splitters or routers exhibit a large temperature variation over their passband channels thus requiring continuous tunability in the multichannel sources, which ability is not yet available. Furthermore, such fabrication problems significantly increase the cost of WDM implementation. Thus, present WDM systems are not currently commercially viable for mass market applications such as fiber distribution to the home.

Accordingly, although WDM offers an elegant solution for increasing the capacity and transparency of optical networks, WDM for fiber distribution networks as currently envisioned is not cost-competitive with simple point-to-point schemes (i.e. one fiber per customer), and more cost-effective schemes are needed. For fiber-to-the-home optical communications systems, low-cost methods of delivering optical signals into and out from the home is a challenging problem. Although time-domain multiplexing (TDM) of data streams would provide another means for increasing transmission capacity, it is not desirable to build a specific network with expensive high frequency electronic components that are difficult to upgrade in the future.

For example, in order to deliver 50 Mbits/sec data rates into a single house, a 32 channel system would require transmitters, routers, amplifiers, receivers and modulators with 1.5 Gbits/sec capacity and above. It is impractical and inefficient to place such expensive and state-of-the-art components into every home. In addition, it is desirable to have as much of the system that is located in the field and in the home be transparent and passive, i.e. line-rate independent and not requiring any separate electrical powering.

In addition to the low data rate systems required for local access (50–155 MHz), high data rate systems (622 MHz–2.5 Gbits/sec) can also benefit from WDM. In such a case, similar problems are caused by the difficulty in obtaining a multifrequency source with adequate channel tuning, stability and modulation bandwidth.

A multifrequency source having adequate channel tuning for use in a passive optical network (PON) is disclosed in commonly owned U.S. patent application Ser. No. 08/548,537, filed Oct. 26, 1995 and entitled *Chirped-Pulse Multiple Wavelength Telecommunications System*. The wavelength source disclosed in that application is a femtosecond laser that produces a continuous repeating frequency band containing a plurality of wavelengths that are substantially overlapping in time. The laser output is connected to a dispersion fiber which temporally separates the multiple wavelengths, which are carried on a common fiber, whereupon a single modulator can be used for modulating select wavelengths in the bandwidth. Properties of the femtosecond laser and the dispersion fiber dictate the time sequence of the wavelengths output from the dispersion fiber so that the wavelengths are temporally spaced in descending order according to wavelength length. Thus, by synchronizing the modulator to the repetition rate of the laser, select wavelengths on a common fiber can be modulated by a single modulator. Once modulated, the band of wavelengths can be fanned-out to serve a plurality of optical network units (ONUs) by inputting the signal to a n×n star coupler and routing discrete wavelengths, via a router, to designated ONUs.

Although the use of a femtosecond laser in conjunction with a dispersion fiber solves many of the problems of the prior art in that a common modulator can be used to modulate the signal at the dispersion fiber output, thus lending such a source suitable for providing data to multiple ONUs, the femtosecond laser and dispersion fiber combination creates several other problems and is, therefore, not suitable for many applications. Specifically, as the femtosecond laser outputs a continuous spectrum, the wavelengths temporally spaced by the dispersion fiber are always present in a predetermined and non-adjustable order. For example, a wavelength of 50 nm will always appear in time before a 30 nm wavelength and, therefore, the 50 nm wavelength will be modulated by the common modulator first. In addition, varying power cannot be applied to discrete wavelengths because a continuous spectrum is output by the femtosecond laser.

These and other drawbacks of a combined femtosecond laser in combination with a dispersion fiber to form a chirped multiwavelength source warrant the need for a multiwavelength source capable of generating wavelengths of various lengths in a controllable and adjustable order wherein power levels to the wavelengths can also be adjusted. Such a source, which in accordance with the present invention is described more fully herein, will be referred to as a "pseudo-chirped" source.

SUMMARY OF THE INVENTION

The aforementioned deficiencies are addressed and an advance is made in the art by a multifrequency optical source operable to supply an optical signal having a plurality of discrete, temporally spaced optical wavelengths so that each discrete wavelength occupies a different time slot. Hence, a single modulator coupled to any output of a power splitter can sequentially modulate some or all of the wavelength channels present on the output signal.

The inventive optical source includes a multifrequency generator having a plurality of input control ports with each respective control port being associated with one of the optical wavelengths. A controller arrangement selectively activates at least some of the control ports at a selected repetition rate and according to a selected sequence to thereby define the temporally spaced arrangement of discrete optical wavelengths in the optical signal which are output on an output port. A data encoding modulator is included for modulating data onto select ones of the generated discrete optical wavelengths. A clock is also provided for synchronizing the output of the optical source to the modulator.

In accordance with an exemplary embodiment of the present invention, the optical source is deployed in a source distribution communications network which also includes a plurality of optical network units having frequency dependent receivers. This is accomplished by connecting the output of the multifrequency generator to a power splitter having an input port for receiving the optical signal and dividing the signal over a plurality of output ports. A plurality of data encoding modulators, each coupled to one of the output ports, are individually operable to sequentially modulate at least some of the wavelengths present on the output ports. A clock is used for synchronizing the time spacing of the discrete optical wavelengths with the modulators.

Illustratively, the frequency dependent receivers may be configured as respective WDM passive optical networks so that a single broadband optical source serves a significantly larger number of subscribers than other proposed arrangements. Each such passive optical network may, for example, include a WDM router and a plurality of optical network units that are each configured to serve a group of subscribers. For example, an optical signal having N wavelengths and a single power splitter having M outputs can serve up to M×N subscribers. When multiple power splitters and amplifiers are cascaded, the number of subscribers can theoretically approach $M^L$×N, where L is the number of power splitter stages.

The present invention also discloses several techniques for detecting the router shift and for communicating the shift to the modulator. The detection can occur by direct communication with one of the optical network units connected to the router, i.e. by measuring the strength or power of the signal received by that particular ONU, which is indicative of the shift of the router. As an alternative, one of the ONUs can be replaced with a reflective grating for reflecting one of the wavelengths back through the router for detection by various monitoring systems located in the HTC for adjusting modulation operation. Lastly, a loop-back fiber connected between an input port of the router and one of the output ports can be used for providing drift information to the HTC.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements throughout the several views.

DETAILED DESCRIPTION OF THE PRESENTLY PREFERRED EMBODIMENTS

Figure 1:
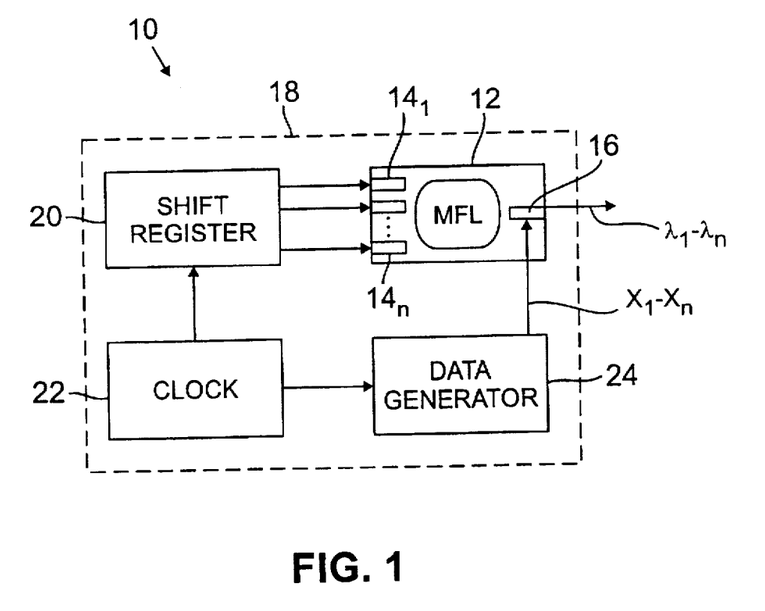
FIG. 1 is a schematic representation of a pseudo-chirped multifrequency light source constructed in accordance with a preferred embodiment of the present invention.

Referring now to the drawings and initially to FIG. 1 thereof, a pseudo-chirped multifrequency light source for use in a WDM system is shown there generally designated by the reference numeral 10. The multifrequency light source includes a source 12 capable of generating multiple discrete wavelengths. The source 12 may be constructed of a plurality of distributed feedback lasers—one being selectively activated at any given time for generating a particular discrete wavelength—which are coupled to a fiber optic cable. More preferably, source 12 may consist of an integrated multifrequency laser of the type described in U.S. Pat. No. No. 5,450,431. For the purposes herein, the pseudo-chirped multifrequency light source 10 will be described (by way of example) as an integrated multifrequency laser 12.

As shown, the multifrequency laser 12 contains a plurality of input ports $14_1$–$14_n$ for energizing corresponding active optical amplifiers, as is known in the art, to generate corresponding wavelengths $\lambda_1$–$\lambda_n$. Each optical amplifier is connected to one end of a waveguide, the other end terminating at an output port 16 which is also connected to an optical amplifier and from which the discrete wavelengths emerge. For lasing, a voltage is applied to output port 16 for biasing the optical amplifier connected thereto in its active region so as to become light-transmissive and to provide gain to the selected lased frequencies. By selectively activating or energizing the input ports 14 a lasing path is formed between the output port 16 and the activated input port for generating a particular discrete wavelength. For example, to generate a wavelength $\lambda_1$, a DC voltage is applied to input port $14_1$. The discrete wavelength $\lambda_1$ will be generated and output from output port 16. Likewise, by applying an appropriate DC voltage to input port $14_n$, a discrete wavelength $\lambda_n$ will be generated. Also, and as is known in the art, by increasing the voltage applied to the input ports 14, the power associated with each discrete wavelength will also be increased.

The pseudo-chirped multifrequency light source 10 is typically included in a host terminal complex (HTC) located at the head-end of a passive optical network for transmitting downstream optical data and for receiving upstream optical data. As shown, the multifrequency laser 12 of the pseudo-chirped light source 10 is interfaced with and activated by a controller arrangement 20 such, for example, as a shift register. The shift register 20 can be programmed to access any of the input ports 14 in any desired order, thereby generating wavelengths $\lambda$ in an order corresponding to the order at which the input ports are activated. A timing regulator such as a clock 22 is provided for activating the shift register at a particular frequency and a data generator 24 including a modulator modulates each discrete wavelength generated by the laser 12 with a data signal $\lambda_1-\lambda_n$.

In operation, and in response to each clock pulse, the shift register 20 is activated which, in turn, activates a select one of the input ports 14 in accordance with a pre-programmed sequence by applying an activation voltage to each input port, e.g. input port $14_1$ is activated, followed by input port $14_3$, input port $14_5$, etc. As is known in the art and as explained above, when each input port is activated, a wavelength $\lambda$ having a length corresponding to the length of the lasing cavity formed between the activated input port and the output port is generated. Thus, for the example given, wavelengths $\lambda_1$, $\lambda_3$ and $\lambda_5$ will be produced. Simultaneously therewith, the data generator 24 will modulate each generated wavelength with particular data. For example, data signal $X_1$ will be used to modulate wavelength $\lambda_1$, data signal $X_3$ will be used to modulate wavelength $\lambda_3$, etc. Thus, the resulting output signal comprises a comb of single frequencies carrying optical data which are temporally spaced by a width of, for example, a clock pulse.

The pseudo-chirped multifrequency light source depicted in FIG. 1 has several advantages over the chirped light source disclosed in the aforementioned U.S. patent application Ser. No. 08/548,537. For example, the sequence or order of wavelength generation can be varied by adjusting the sequence at which the shift register activates the individual input ports 14. Also, the power associated with each wavelength can be varied by adjusting the voltage applied to each input port. In addition, the temporal spacing between each wavelength can be varied by adjusting the operating frequency of the clock 22. It is also relatively easy to monitor the power level associated with each wavelength because, as the wavelengths are temporally spaced and discrete, a particular wavelength can be isolated. Still other benefits also result from this arrangement.

Figure 2:
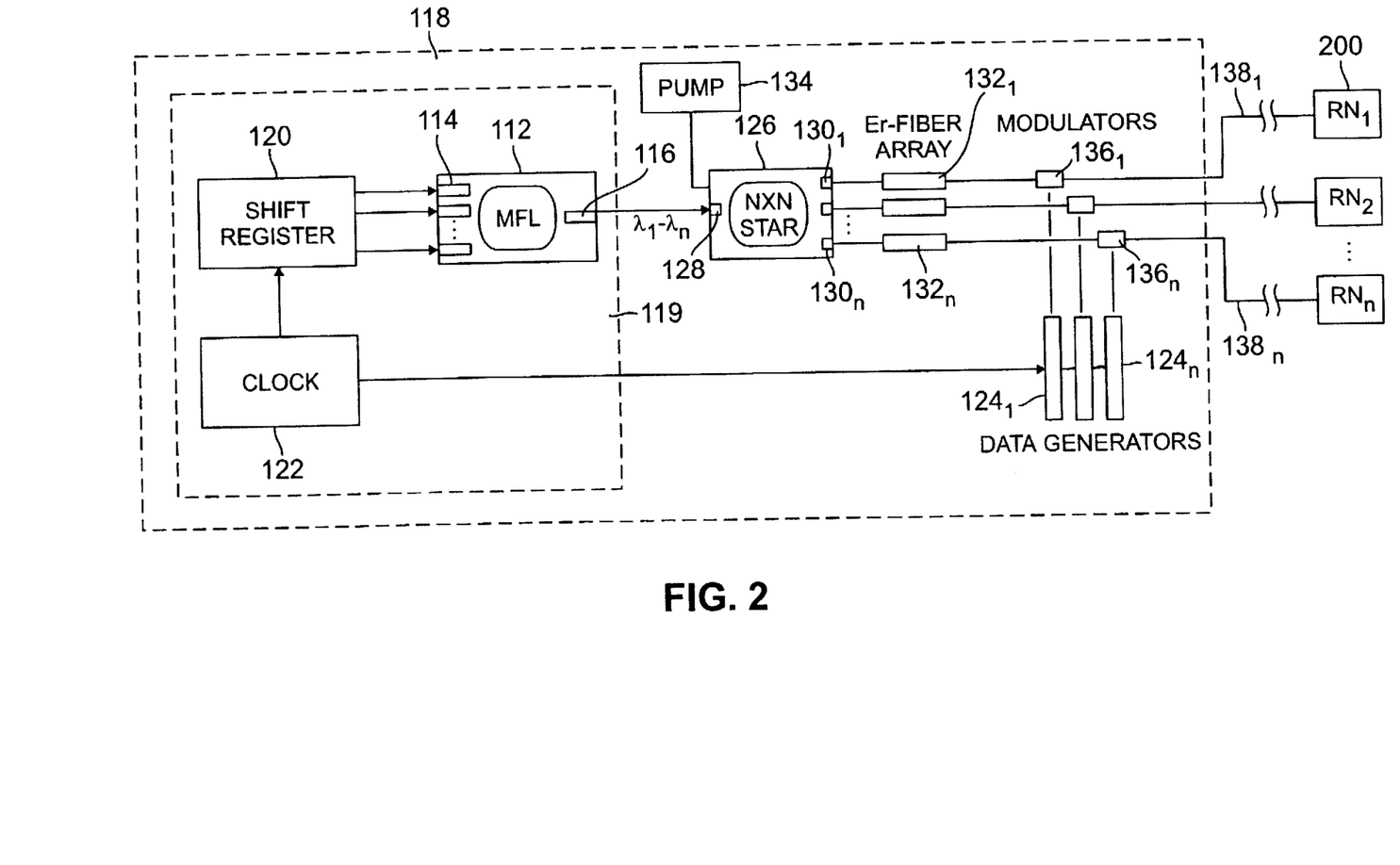
FIG. 2 is a schematic representation of the head-end of a passive optical network containing a pseudo-chirped multifrequency light source arranged in a cascaded configuration.

Referring now to FIG. 2, a cascaded passive optical network (PON) incorporating a host terminal complex (HTC) 118 is shown. The HTC 118 includes a pseudo-chirped multifrequency light source 119 modified to operate in a cascaded configuration. Like the chirped light source 10 of FIG. 1, the modified light source 119 also contains a multifrequency laser 112 interfaced with a shift register 120 for selectively generating discrete wavelengths $\lambda$ in accordance with a predetermined sequence. The discrete wavelengths are temporally spaced from each other a distance equivalent to the width of the clock pulse generated by clock 122, which is also interfaced with and operates shift register 120. A plurality of data generators $124_1-124_n$, whose operation is more fully described below, are also responsive to the clock signal generated by clock 122. The temporally spaced discrete wavelengths $\lambda_1-\lambda_n$ are provided to a power splitter 126, such as an n×n star coupler and, specifically, to an input port 128 thereof for splitting-up or dividing the temporally spaced combined signal into a plurality of signals which are, in turn, output via a plurality of output ports $130_1-130_n$. Thus, and as is known in the art, each signal output from each output port 130 comprises all of the discrete frequencies $\lambda_1-\lambda_n$. However, and as also known in the art, the power of each resulting signal is also divided among the plurality of output ports. Accordingly, to increase the power of each signal, an array of erbium doped fiber amplifiers 132 are coupled to each output port 130 for increasing the power of each resulting signal. A broadband source, such as a pump laser 134, is provided to an input of the star coupler 126 for powering each erbium doped fiber amplifier 132 in the array.

As should be readily understood, the output of each erbium doped fiber amplifier 132 contains a temporally spaced multiwavelength signal having wavelengths $\lambda_1-\lambda_n$ which, as explained above, can be arranged in any particular order by programming the shift register 120 in an appropriate manner. A plurality of modulators $136_1-136_n$ are provided to the output of each erbium doped fiber amplifier 132. The modulators are operated in response to the corresponding data generators 124 for modulating selected discrete signals with particular data supplied by the data generators 124. Thus, for example, data generator $124_1$ will supply a data signal $X_1$ to modulator $136_1$ which is used to modulate discrete wavelength $\lambda_1$. In addition, data generator $124_1$ can provide data signal $X_2$ to modulator $136_1$ for modulating discrete wavelength $\lambda_2$ with data signal $X_2$. Likewise, data generator $124_2$ can provide data signal $X_1$ to modulator $136_2$ for modulating any of the wavelengths contained in the signal output from fiber amplifier $132_2$. As will be appreciated, many combinations can be realized with the foregoing arrangement without deviating from the scope of the present invention, the result being a plurality of optical signals comprised of separately modulated and temporally spaced and arrangeable discrete wavelengths.

Each resulting modulated optical signal is output by each modulator 136 on a separate optic fiber 138 for transmission downstream to corresponding remote nodes (RN) 200. Thus, utilizing the pseudo-chirped multifrequency light source 119 coupled to a power splitter 126 having M output ports, and providing thereto a discrete multiwavelength signal having n discrete wavelengths, the transmission of the discrete optical signal to M remote nodes 200, each capable of serving up to n different subscribers is possible. Furthermore, and as described above, the sequence of the wavelengths and the power associated with each are readily adjustable.

Figure 3:
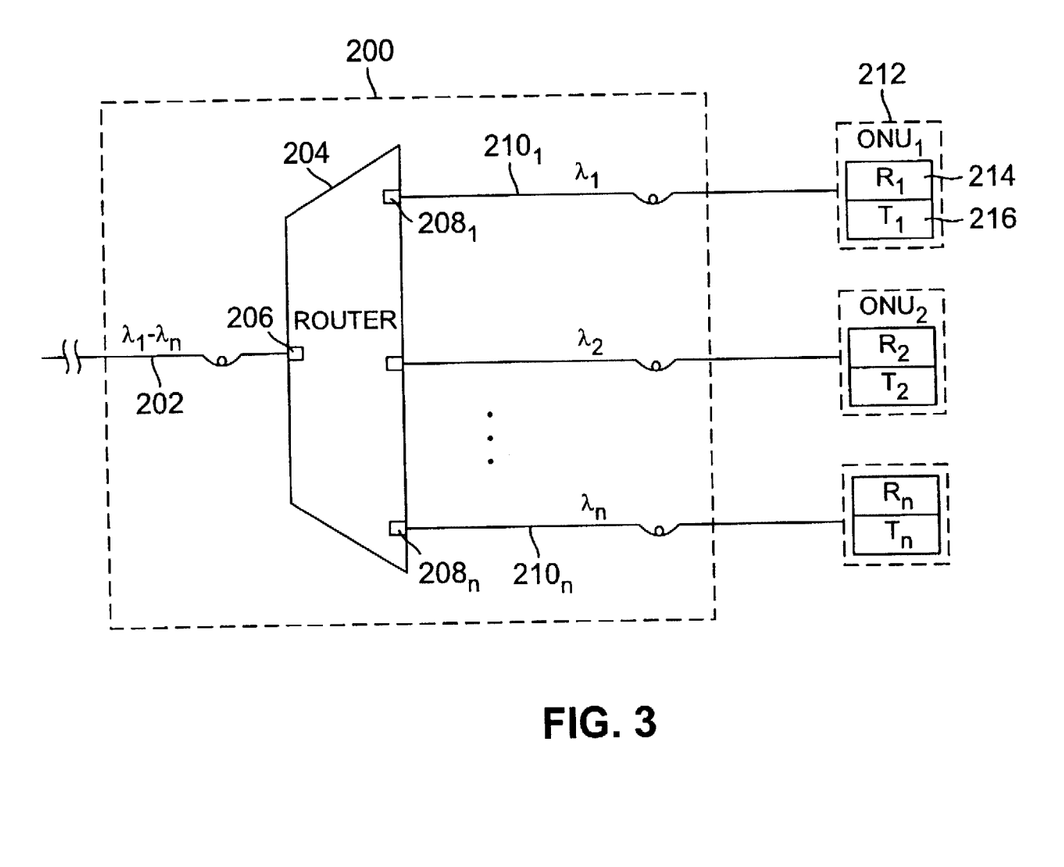
FIG. 3 depicts a portion of the remainder of the passive optical network illustrated in FIG. 2.

Turning now to FIG. 3, the downstream portion of the cascaded PON 100 and, specifically, a select remote node 200 thereof is depicted. As shown, a connection optical fiber 202 is provided for carrying one of the optical signals from optical fiber $138_1$ downstream. The optical signal is input to a dispersion mechanism such as a multi-frequency router 204 having an upstream port 206 and a plurality of downstream channels or ports $208_1$–$208_n$. The operation of a suitable multifrequency router 204 is more fully described in U.S. Pat. No. 5,136,671. In general, however, router 204 contains multiple optical paths, each of which exhibits a particular passband channel. Each passband is a particular filter shape which permits the passage of one or more particular wavelengths along the respective optical path, to the substantial exclusion of others. Thus, router 204 divides or separates the wavelengths of the incoming optical signal present at the upstream port 206 into a plurality of discrete wavelengths and places the discrete wavelengths, either in groups or individually—depending on the filter shapes of the channels—on the designated output ports $208_1$–$208_n$. Thus, if each the discrete wavelengths are temporally spaced such that each channel passes only a single wavelength, a separate wavelength would appear on each output port 208.

A plurality of drop fibers 210 communicate the discrete optical wavelengths $\lambda_1$–$\lambda_n$ to corresponding optical network units (ONUs) 212. For example, router 204 will direct or route wavelength $\lambda_1$ to $ONU_1$, wavelength $\lambda_2$ to $ONU_2$ and wavelength $\lambda_n$ to $ONU_n$. Each ONU may be, for example, located in a user's home for providing that user with the data signal X used to modulate the particular wavelength directed to the corresponding ONU.

As shown, each ONU contains a receiver (R) 214 for demodulating the optical signal in order to retrieve the data signal intended for the receiving ONU. In addition, and as will be appreciated, the PON 100 is intended for bi-directional communication. In other words, data is not only transmitted in the downstream direction from the HTC to the various different ONUs, but data from each ONU must, likewise, be transmitted to the HTC in an upstream direction. Accordingly, each ONU is provided with a transmitter (T) 216 for transmitting data in an upstream direction in a manner more fully described in U.S. patent application Ser. No. 08/603,577, filed Feb. 23, 1996 and titled *Passive Optical Network For Dense WDM Downstream Data Transmission and Upstream Data Transmission*.

To utilize the pseudo-chirped multifrequency light source 119 in a cascaded PON 100 as described hereinabove, dynamic tuning or adjustment of the modulators 136 must be performed to ensure that the data signals intended for particular ONUs located downstream, are, in fact, received by the appropriate ONUs. Thus, tracking of the discrete wavelengths must be performed to determine when adjustment of the modulators 136 is necessary due to the drifting properties of the router 204.

As is known in the art, router 204 is a semiconductor device and is, therefore, temperature sensitive. Since the routers 204 are usually located or positioned in remote nodes 200 located downstream in a passive optical network, the temperature of the environment in which the routers are disposed may vary, thus varying the characteristics of the router. Also as is known in the art, under ideal conditions the router 204 is a parallel device and, thus, if the routing function performed thereby is shifted or adjusted by a certain amount such that wavelength $\lambda_1$ is no longer provided or output onto drop fiber line $210_1$ but is, instead, routed to drop line $210_n$ due to the wrap-around properties of the router, wavelength $\lambda_2$ will be, in turn, routed to drop fiber line $210_1$, etc. However, if wavelength $\lambda_1$ is still modulated with data signal $X_1$ which is intended for $ONU_1$, then the intended ONU will no longer receive the appropriate data. Instead, $ONU_5$ will receive wavelength $\lambda_2$ instead of wavelength $\lambda_1$ and, thus, will receive the data signal which was used to modulate wavelength $\lambda_2$ by modulator $136_2$ located in the HTC 118. As will therefore be appreciated, tuning of the modulators 136 is necessary to compensate for router shifting resulting from changes in the router environment temperature.

Figure 6A:
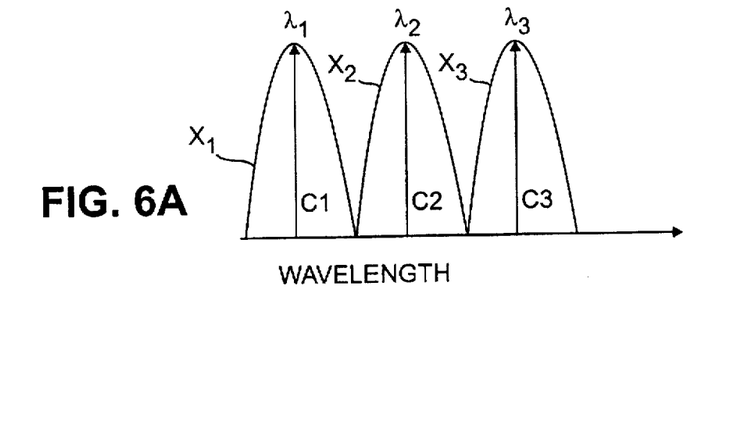
FIGS. 6A and 6B illustrate the relationship between wavelengths and router channels as a result of router drift in the absence of channel spacing.
Figure 6B:
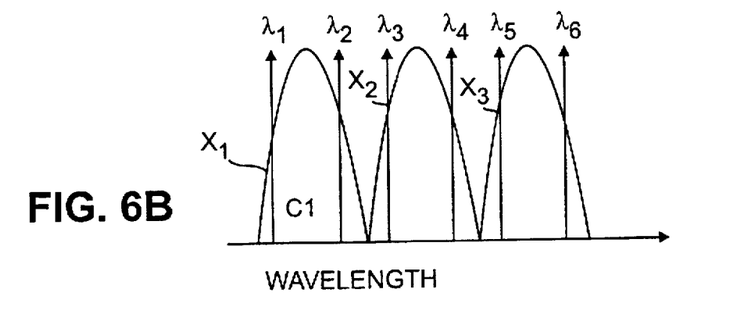

By way of further explanation, reference is now made to FIG. 6A which depicts the relationship between the discrete wavelengths and the router channels. As shown, for a particular temperature, router channel $C_1$ passes wavelength $\lambda_1$ which carries data signal $X_1$, and router channel $C_2$ passes wavelength $\lambda_2$ which carries signal $X_2$, etc. However, and as shown in FIG. 6B, when the temperature of the router 204 changes, the router channels drift such that channel $C_1$ passes a portion of each of wavelengths $\lambda_1$ and $\lambda_2$ and, hence, the modulated data signals $X_1$ and $X_2$. Therefore, if channel $C_1$ is routed to $ONU_1$, the intended data $X_1$ will have interference from data signal $X_2$ which is carried by wavelength $\lambda_2$. The same problem occurs for other ONUs connected to the router 204. To compensate for this problem, in accordance with the present invention the pseudo-chirped multifrequency light source 119 generates at least twice as many discrete wavelengths as router channels so as to assure sufficient spacing between adjacent data signals, and wavelength tracking can be conducted to determine appropriate modulator tuning.

As stated above, to reduce interference or cross-talk from adjacent router channels, the preferred embodiment of the invention generates at least 2N wavelengths for every N router channels, with two adjacent wavelengths being passed by each channel. Thus, each receiver in each ONU 212 is capable of receiving at least two frequencies at any given time. Such a configuration accommodates modulator tuning between adjacent wavelengths without intolerable signal loss. For example, if each ONU receives two adjacent wavelengths and if the data signal intended for a particular ONU is found on one or the other of those wavelengths, or on both of those wavelengths, then when router drift occurs the ONU will still receive a strong signal from either or both of the routed frequencies.

Figure 7A:
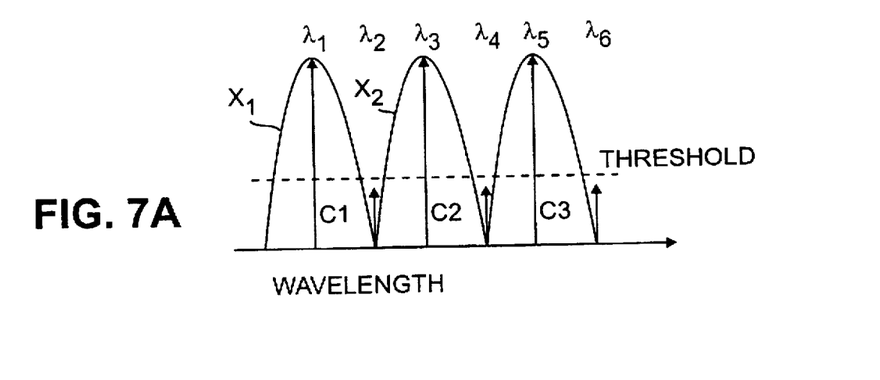
FIGS. 7A–7D illustrate the relationship between wavelengths and router channels resulting from router drift in a system utilizing channel spacing.

More specifically, depicted in FIG. 7A is a graphic representation of the router channels and the wavelengths passed thereby. In a manner similar to that described with respect to FIG. 6A, data signal $X_1$ is used to modulate and is carried by wavelength $\lambda_1$, which is passed by router channel $C_1$ through, for example, router port $208_1$. The portion of data signal $X_1$ carried by wavelength $\lambda_2$ is insignificant, i.e. the power associated therewith is below a predetermined threshold value indicated by the dotted line in FIG. 7A. A suitable threshold value is 6 dB below peak. A like situation is shown for wavelength pairs $\lambda_3$, $\lambda_4$ and $\lambda_5$, $\lambda_6$.

Figure 7B:
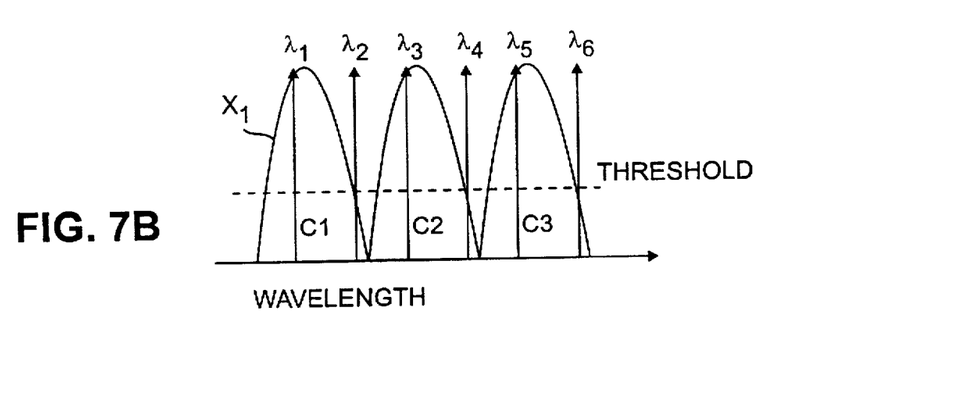

With reference to FIG. 7B, however, as a result of router drift the discrete wavelengths are shifted to different router channels, i.e. routed in an upward direction as indicated in FIG. 3, so that the power associated with wavelength $\lambda_1$ as received by $ONU_1$ is not as strong as that indicated in FIG. 7A. When this occurs, a measurement of the power of $\lambda_1$ can be provided to the HTC 118 for controlling and adjusting the tuning of the corresponding modulators 136 to also modulate the neighboring frequency with the same data signal. For example, wavelength $\lambda_2$ will, in addition to wavelength $\lambda_1$, be modulated with data signal $X_1$, etc. Therefore, for the illustrative example of FIG. 7B, wavelength $\lambda_1$ still carries a majority of data $X_1$ and wavelength $\lambda_2$ now carries a small portion of data $X_1$.

Figure 7C:
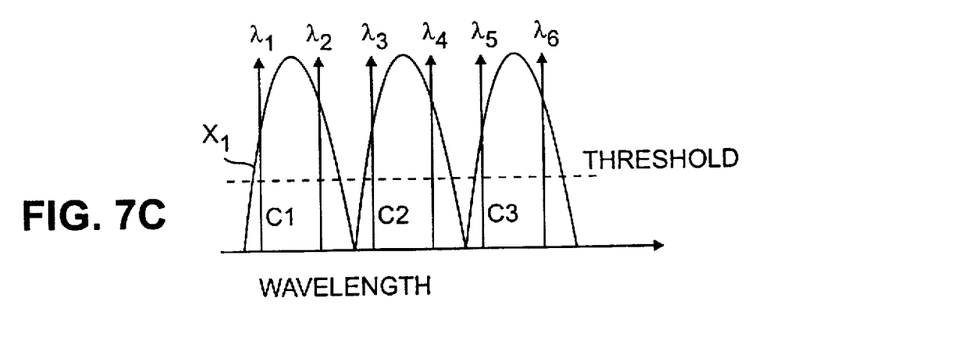
Figure 7D:
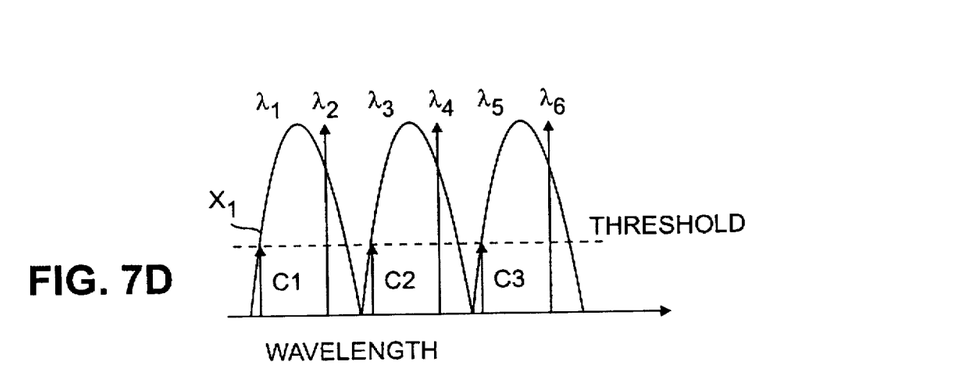

Further drift is indicated in FIGS. 7C and 7D. As there shown, data signal $X_1$ is shifted over from wavelength $\lambda_1$ to wavelength $\lambda_2$. In other words, in FIG. 7C, both wavelengths $\lambda_1$ and $\lambda_2$ carry data signal $X_1$. However, in FIG. 7D, the power associated with $\lambda_1$ is below the threshold power level and, therefore, data signal $X_1$ is used only to modulate wavelength $\lambda_2$. Thus, the modulators are adjusted so that when a certain minimum power level is detected, wavelength $\lambda_1$ will no longer carry data signal $X_1$ intended for $ONU_1$ and the entire data signal $X_1$ will be carried by wavelength $\lambda_2$.

One method of tracking the discrete wavelengths is by transmitting or reflecting a signal indicative of wavelength power generated by, for example, a detector mechanism 213 disposed in one of the ONUs ($ONU_1$) for signalling that the power or strength of the wavelength carrying the data signal intended for that ONU has weakened. Such a signal can be directed in an upstream direction through the router, which is bi-directionally transmissive, to the HTC 118 for adjustment or tuning of modulators 136. For example, if data $X_1$ is intended for $ONU_1$ and is currently carried by wavelength $\lambda_1$, then when router 204 drifts, the detector in $ONU_1$ will communicate to the HTC 118 that the power level of wavelength $\lambda_1$ has declined below the threshold value. Upon receiving this indication or signal, the HTC 118 will adjust the modulators 136 so that data signal $X_1$ will now be used to modulate an adjacent wavelength, i.e. $\lambda_2$.

Under ideal conditions, the router 204 is a parallel device and, therefore, only one ONU in the plurality of ONUs need contain the detector 213 because each signal received by each ONU in the plurality will decrease by the same amount and, therefore, each signal will require the same shift adjustment. However, if the discrete wavelengths are not equidistantly temporally spaced, such as if the rate of clock 122 varies, then the channel shift will not be constant across all of the router channels 208. In such instances, it is beneficial to measure the power of the wavelengths received by each ONU so that only the necessary modulators need be adjusted. Such multiple power measurements will also provide information as to the direction of router drift.

Figure 4:
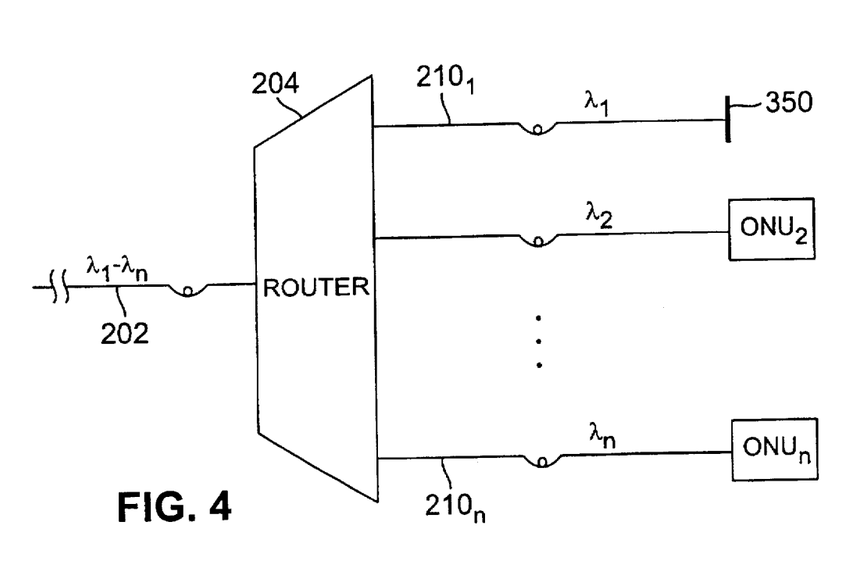
FIG. 4 depicts another illustrative embodiment of the present invention.
Figure 5:
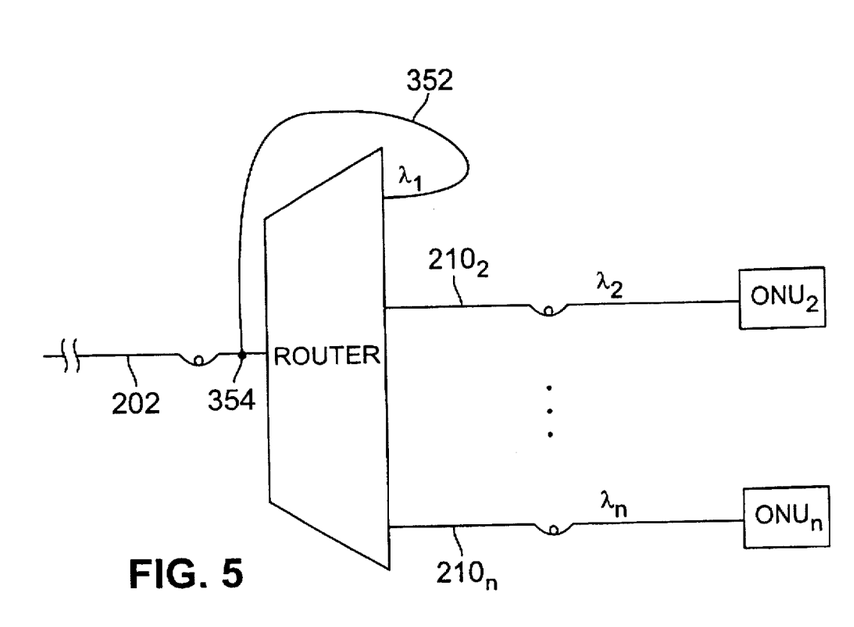
FIG. 5 illustrates yet another embodiment of the present invention.

While modifying one or more of the ONUs in a passive optical network to contain a signal detection mechanism 213 will serve as an indicator of when modulation tuning is needed, such a solution is not practical in many instances as the cost of each ONU will increase. Also, as it is intended that the individual ONUs be mass produced, specially equipping one or more ONUs in a plurality of ONUs connected to each remote node with diagnostic capabilities is impractical. Accordingly, and with reference now to FIG. 4, as an alternative to a specially designed ONU one of the ONUs in the plurality ($ONU_1$) may be removed and replaced with a reflective plate or grating 350 for reflecting back, in the upstream direction, the wavelength that is output on one of the drop fiber lines ($210_1$). As a further alternative, a loop-back fiber 352, as shown in FIG. 5, may be used to connect one of the output ports of router 204 to the connection optic fiber 202 via an optical coupler 354 so as to provide the wavelength that is output from that output port ($\lambda_1$) to the HTC 118 for necessary or appropriate adjustment or tuning of the modulator.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, although the invention was described herein using an integrated multifrequency laser, it should be readily understood by those having ordinary skill in the art that a plurality of distributed feedback lasers can be substituted therefor without departing from the scope of the present invention. It is also expressly intended that all combinations of those elements and/or method steps which perform substantially the same function in substantially the same way to achieve the same results are within the scope of the invention. In addition, it is to be understood that the drawings are not necessarily drawn to scale but that they are merely conceptual in nature. It is the intention, therefore, to be limited only as indicated by the scope of the claims appended hereto.

What is claimed is:

1. A wavelength division multiplexed (WDM) optical source distribution network, comprising:

an optical transmitter including a multifrequency optical source for supplying a WDM optical signal having a plurality of discrete, temporally spaced optical wavelengths, said optical source having a plurality of input control ports each associated with one of said optical wavelengths;

a controller for selectively activating at least some of said associated control ports at a selected repetition rate and according to a selected sequence to thereby define a temporally spaced arrangement of discrete optical wavelengths in said optical signal;

a power splitter having an input port for receiving the optical signal from said multifrequency source, and a plurality of output ports, each outputting a WDM signal comprised of said temporally spaced arrangement of discrete optical wavelengths;

a plurality of data encoding modulators each coupled to one of said output ports and operable to sequentially modulate at least some of the WDM signals with data signals so that the same optical wavelength in said at least some WDM signals can be modulated with different data signals; and a plurality of remote nodes each operable to receive and wavelength demultiplex a modulated optical signal received from one of said data encoding modulators over an optical medium.

2. The optical source distribution network of claim 1, wherein at least one of said remote nodes comprises a wavelength router for routing a demultiplexed signal to a corresponding optical network unit(ONU).

3. The optical distribution network of claim 2, wherein said multifrequency optical source and said plurality of data encoder modulators form a part of a Host Terminal Complex (HTC), and wherein said wavelength router comprises an upstream port and a plurality of downstream ports, said network further comprising an optical reflector connected to one of the downstream ports of said wavelength router for communicating to the HTC a signal indicative of a power level of one of said demultiplexed signals.

4. The optical distribution network of claim 2, wherein said multifrequency optical source and said plurality of data encoder modulators form a part of a Host Terminal Complex (HTC), and wherein said wavelength router comprises an upstream port and a plurality of downstream ports, said network further comprising a loop-back optic fiber connected between the upstream port and one of the downstream ports of said wavelength router for communicating to the HTC a signal indicative of a power level of one of said demultiplexed signals.

5. The optical source distribution network of claim 1, wherein said power splitter further comprises at least a second input port for receiving a power signal for amplifying a power level of at least some of the WDM signals.

6. The optical source distribution network of claim 1, further comprising a plurality of fiber amplifiers, in communication with at least some of said power splitter output ports for amplifying said WDM signals.

7. The optical distribution network of claim 2, wherein said multifrequency optical source and said plurality of data encoding modulators form a part of a Host Terminal Complex (HTC), and wherein at least one of said plural ONUs further comprises a device for measuring power of the received corresponding demultiplexed signal and for communicating a signal indicative of the measured power to the HTC.

8. A method of operating an optical communications network, comprising the steps of:

selectively activating at least some control ports of a multifrequency optical source at a selected repetition rate and according to a selected sequence to thereby supply a wavelength division multiplexed optical signal having a plurality of temporally spaced optical wavelengths, each said control port being associated with a corresponding one of said optical wavelengths;

launching said optical signal onto an optical medium for transmission to a frequency dependent receiver operable to receive and wavelength demultiplex said optical signal;

power splitting the optical signal to thereby obtain a plurality of reduced power WDM optical signals, each WDM optical signal comprising said temporally spaced optical wavelengths;

sequentially modulating at least some of the reduced power WDM optical signals with data signals so that the same optical wavelength in said at least some WDM optical signals can be modulated with different data signals; receiving at least one modulated WDM optical signal at a first passive optical network unit including a wavelength router and a plurality of optical network units (ONUs), each said ONU being connected for receiving from said router a corresponding demultiplexed signal; and receiving another of said modulated WDM optical signals at a second passive optical network including a second wavelength router and a second plurality of ONUs.

* * * * *